United States Patent
Daikai et al.

(10) Patent No.: US 6,679,295 B2
(45) Date of Patent: Jan. 20, 2004

(54) VIBRATION ABSORBING RUBBER HOSE

(75) Inventors: Eiichi Daikai, Inuyama (JP); Norihiko Furuta, Komaki (JP); Tetsuya Arima, Kasugai (JP); Shinobu Kanbe, Komaki (JP)

(73) Assignee: Tokai Rubber Industries, Ltd., Komaki (JP)

( * ) Notice: Subject to any disclaimer, the term of this patent is extended or adjusted under 35 U.S.C. 154(b) by 0 days.

(21) Appl. No.: 10/206,606

(22) Filed: Jul. 26, 2002

(65) Prior Publication Data

US 2003/0034081 A1 Feb. 20, 2003

(30) Foreign Application Priority Data

Aug. 9, 2001 (JP) .................................. 2001-242629

(51) Int. Cl.$^7$ .................................................. F16L 11/08
(52) U.S. Cl. ................... 138/126; 138/137; 138/140; 138/124; 428/36.8; 428/36.91
(58) Field of Search ........................ 138/137, 140, 138/141, 126, 125, 123, DIG. 10, 124; 428/36.2, 36.8, 36.91

(56) References Cited

U.S. PATENT DOCUMENTS

| | | | | |
|---|---|---|---|---|
| 4,734,305 A | * | 3/1988 | Sugimoto et al. | 428/36.2 |
| 4,802,938 A | * | 2/1989 | Kitami et al. | 156/149 |
| 4,862,923 A | | 9/1989 | Kitami et al. | 138/125 |
| 5,112,660 A | * | 5/1992 | Saito et al. | 428/36.8 |
| 5,264,262 A | * | 11/1993 | Igarashi | 428/36.9 |
| 5,362,530 A | | 11/1994 | Kitami et al. | 428/36.2 |
| 5,957,164 A | * | 9/1999 | Campbell | 138/137 |
| 6,068,026 A | | 5/2000 | Garois | 138/126 |
| 6,213,155 B1 | * | 4/2001 | Furuta et al. | 138/123 |

FOREIGN PATENT DOCUMENTS

| | | |
|---|---|---|
| EP | 0 643 095 A | 3/1995 |
| EP | 0959285 A1 | 11/1999 |
| EP | 1 229 284 A | 8/2002 |
| EP | 1 235 017 A | 8/2002 |
| JP | 10-47552 | 2/1998 |

OTHER PUBLICATIONS

Arima, Tetsuya et al. Refrigerant Tranporting Hose, Oct. 13, 2002 PGPub#U.S. 2002/0157722 A1.*
Patent Abstracts of Japan 02–080880, Mar. 20, 1990.
Patent Abstracts of Japan 03–140688, Jun. 14, 1991.

* cited by examiner

Primary Examiner—Patrick Brinson
(74) Attorney, Agent, or Firm—Burr & Brown

(57) ABSTRACT

A vibration absorbing rubber hose having a laminar structure including an inner rubber layer, a reinforcing layer, and an outer rubber layer, which layers are laminated integrally with one another in the order of description in a radially outward direction of the rubber hose, wherein the inner rubber layer is formed of a butyl rubber material and/or a halogenated butyl rubber material while the outer rubber layer is formed of an EPM material consisting of ethylene-propylene copolymer.

13 Claims, 3 Drawing Sheets

VIBRATION ABSORBING RUBBER HOSE

This application is based on Japanese Patent Application No. 2001-242629 filed on Aug. 9, 2001, the contents of which are incorporated hereinto by reference.

BACKGROUND OF THE INVENTION

1. Field of the Invention

The present invention relates to a vibration absorbing rubber hose, and more particularly to a rubber hose which is capable of exhibiting an excellent vibration absorbing characteristic and suitably used as a conduit or piping for a cooler or an air conditioner in an automotive vehicle.

2. Discussion of Related Art

A hose for transporting a refrigerant such as a flon gas is used as a conduit or piping for a cooler or an air conditioner in an automotive vehicle. In order to prevent a leakage flow of the refrigerant such as the flon gas having a low molecular weight through the hose and minimize environmental contamination, a hose of resin-rubber composite type having a laminar structure is mainly used as such a refrigerant transporting hose. The hose of resin-rubber composite type includes, as an innermost layer or an intermediate layer thereof, at least one resin layer formed of a resin material such as polyamide resin capable of exhibiting excellent gas impermeability.

The hose of resin-rubber composite type described above, however, has a low degree of flexibility or a high degree of rigidity of the resin layer, so that the vibrations generated during operations of the air conditioning system (including a compressor) and the internal combustion engine are transmitted via the hose to the components of the air conditioning system and the vehicle body. Accordingly, the hose of resin-rubber composite type described above does not exhibit a satisfactory vibration absorbing characteristic to reduce sound or noise which arises from the generated vibrations. Thus, the hose is generally required to exhibit a sufficiently high degree of flexibility and an excellent vibration absorbing characteristic. In particular, a low-pressure hose for transporting the refrigerant is desirably formed as a rubber hose consisting of at least one rubber layer and at least one reinforcing layer, without including the resin layer, for thereby considerably increasing the flexibility of the hose and assuring a satisfactory resistance to permeation of the refrigerant.

In JP-A-2-80880 and JP-A-3-140688, there is proposed a refrigerant transporting hose which does not have the resin layer as a barrier layer for preventing the refrigerant from permeating through the hose. Described in detail, the proposed refrigerant transporting hose is formed as a rubber hose having a laminar structure including an inner rubber layer, a reinforcing fiber layer formed of a suitable fiber, and an outer rubber layer, which layers are laminated integrally on one another in the order of description in the radially outward direction of the hose. The inner rubber layer is formed of a butyl rubber or a halogenated butyl rubber, which exhibits a high degree of resistance to permeation of 1,1,1,2-tetrafluoroethane (HFC134a) as one example of the flon gas, while the outer rubber layer is formed of an ethylene-propylene-diene rubber (EPDM) or a chloroprene rubber (CR). The thus formed conventional rubber hose without the resin layer as the barrier layer, however, is not satisfactory in terms of its vibration absorbing characteristic.

The rubber hose is required to exhibit the desired vibration absorbing characteristic over a wide range of temperature in which the rubber hose is used. The low-pressure hose for transporting the refrigerant used in the air conditioning system is exposed to a comparatively low temperature around 0° C. while the air conditioning system is operated. On the other hand, while the air conditioning system is not operated, the hose is exposed to the ambient temperature, that is, the temperature of the environment in which the hose is disposed, e.g., a comparatively high temperature around 80° C. in an engine room of the automotive vehicle. Accordingly, the hose is required to exhibit an excellent vibration absorbing characteristic over a wide temperature range, i.e., at a considerably low temperature and at a considerably high temperature. In view of the recent demands for reducing the size of the engine room and increasing the output of the engine of the automotive vehicle, the refrigerant transporting hose is likely to be used under a high-temperature condition. Further, it is desirable to eliminate the need of the maintenance of the hose. Thus, the refrigerant transporting hose used in the air conditioning system of the automotive vehicle is required to exhibit a high degree of resistance to heat and a high degree of vibration absorbing characteristic, even in the high-temperature condition.

The conventional rubber hose having the laminar structure described above, however, is not satisfactory for the following reasons when it is used in a condition wherein the hose is subjected to the vibrations, e.g., when the hose is used as the refrigerant transporting hose. Namely, the conventional rubber hose is not capable of exhibiting a high degree of vibration absorbing characteristic over the wide temperature range from the considerably low temperature to the considerably high temperature since the material characteristics of the hose greatly change with changes of the temperature in which the hose is used. Accordingly, the conventional rubber hose is not capable of reducing the noise due to its vibrations.

SUMMARY OF THE INVENTION

As a result of an extensive study made by the inventors of the present invention to produce a hose capable of exhibiting high degrees of flexibility and vibration absorbing characteristic over a wide temperature range from a considerably low temperature to a considerably high temperature, it was found that it is desirable that the hose has a low value of storage Young's modulus (E') and a high value of loss factor (tan $\delta$) and that the hose is formed of a material which assures reduced temperature dependency of those physical properties, i.e., the storage Young's modulus and the loss factor. The inventors found that an EPM material consisting of ethylene-propylene copolymer is excellent in terms of the storage Young's modulus and the loss factor, and that the EPM material assures reduced temperature dependency of those physical properties. Accordingly, the rubber hose wherein the outer rubber layer of its laminar structure is formed of the EPM material exhibits a good vibration absorbing characteristic, and the temperature dependency of its vibration absorbing characteristic is significantly reduced.

It is therefore an object of the present invention to provide a rubber hose which exhibits high degrees of flexibility and vibration absorbing characteristic over a wide range of the temperature in which the hose is used, i.e., at a considerably low temperature and at a considerably high temperature, the rubber hose being used, in particular, as a refrigerant transporting hose in which the temperature dependency of its vibration absorbing characteristic is significantly reduced.

The above-indicated object of the present invention may be achieved according to a principle of the invention, which provides a vibration absorbing rubber hose having a laminar structure including an inner rubber layer, a reinforcing layer, and an outer rubber layer, which layers are laminated integrally with one another in the order of description in a radially outward direction of the rubber hose, wherein the inner rubber layer is formed of a butyl rubber material and/or a halogenated butyl rubber material while the outer rubber layer is formed of an EPM material consisting of ethylene-propylene copolymer.

In the vibration absorbing rubber hose constructed as described above, the outer rubber layer of its laminar structure is formed of the EPM material which is excellent in terms of not only flexibility but also storage Young's modulus and loss factor, and which assures reduced temperature dependency of those physical properties. Accordingly, the present vibration absorbing rubber hose assures high degrees of flexibility and vibration absorbing characteristic over a wide temperature range from a considerably low temperature to a considerably high temperature. Therefore, the rubber hose is prevented from vibrating, so that the noise due to the vibration of the hose can be effectively minimized or prevented.

In one preferred form of the present invention, the EPM material is vulcanized to provide the outer rubber layer, by using a peroxide as a vulcanizing agent in the presence of a co-crosslinking agent whose molecular weight is not smaller than 200 or which has three or more functional groups. In the present rubber hose whose outer rubber layer is constituted by the vulcanized EPM rubber which is obtained by vulcanizing the EPM material with the peroxide in the presence of the co-crosslinking agent or coagent described above, the deterioration of the physical properties exhibited by the vulcanized EPM rubber are effectively prevented even when the EPM material for the outer rubber layer is laminated on and vulcanized with different kinds of rubber materials to provide the laminar structure of the hose. Accordingly, the present rubber hose advantageously exhibits the desired properties provided by the EPM material.

In another preferred form of the present invention, the EPM material which has been vulcanized with the peroxide in the presence of the co-crosslinking agent to provide the outer rubber layer has a characteristic which satisfies the following formulas:

$$E'(-20°\ C.) \leq 1.0 \times 10^9\ dyn/cm^2$$

$$[E'(100°\ C.)/E'(-20°\ C.)] \geq 0.1$$

$$\tan \delta(100°\ C.) \geq 0.10$$

$$[\tan \delta(100°\ C.)/\tan \delta(-20°\ C.)] \geq 0.3$$

wherein,
- E'(−20° C.): storage Young's modulus in an atmosphere at a temperature of −20° C.
- tan δ(−20° C.): loss factor in an atmosphere at a temperature of −20° C.
- E'(100° C.): storage Young's modulus in an atmosphere at a temperature of 100° C.
- tan δ(100° C.): loss factor in an atmosphere at a temperature of 100° C.

The present arrangement provides the intended vibration absorbing rubber hose which exhibits high degrees of flexibility and vibration absorbing characteristic over the wide range of temperature in which the rubber hose is used.

In still another preferred form of the present invention, the vibration absorbing rubber hose is used as a refrigerant transporting hose for transporting a refrigerant. Described in detail, the present vibration absorbing rubber hose having the laminar structure whose inner rubber layer is formed of the butyl rubber material and/or the halogenated butyl rubber material can be used as a practically satisfactory refrigerant transporting hose which assures a considerably low degree of permeation of the refrigerant therethrough. The refrigerant which is transported by the present rubber hose preferably contains 1,1,1,2-tetrafluoroethane (HFC134a:$CF_3CH_2F$) as a major component.

BRIEF DESCRIPTION OF THE DRAWINGS

The above and other objects, features, advantages and technical and industrial significance of the present invention will be better understood by reading the following detailed description of a presently preferred embodiment of the invention, when considered in connection with the accompanying drawings, in which.

DETAILED DESCRIPTION OF THE PREFERRED EMBODIMENT

Figure 1:
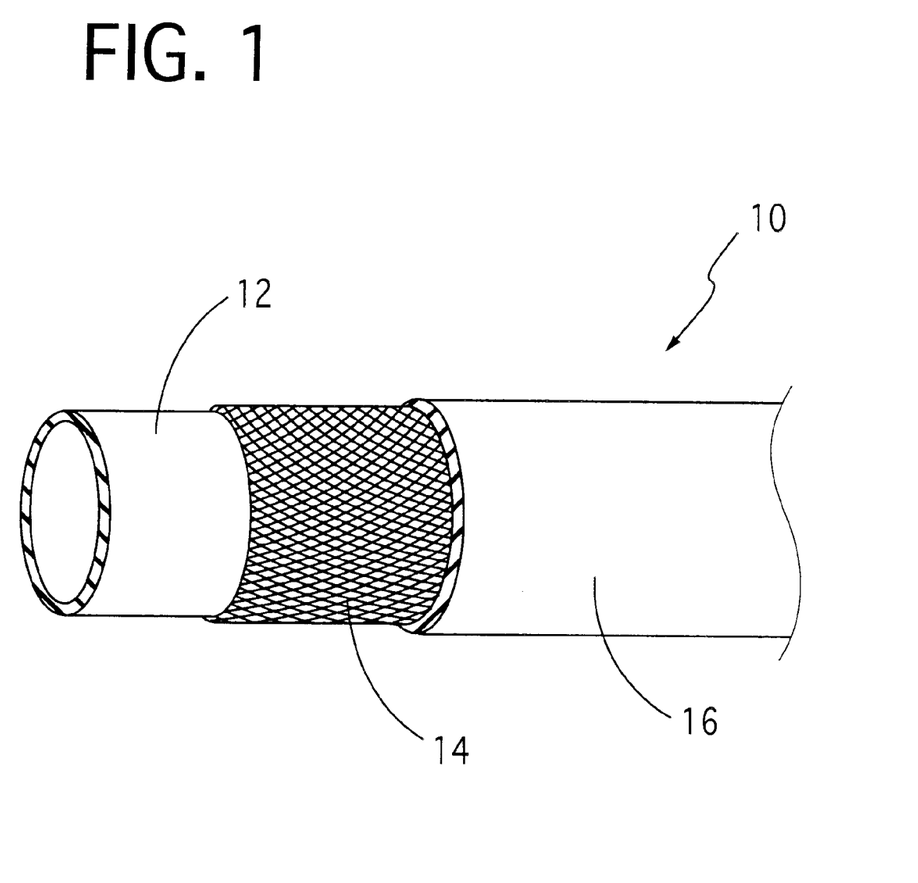
FIG. 1 is a perspective view showing the construction of a refrigerant transporting hose according to one embodiment of the present invention.

Referring first to FIG. 1, there is shown a vibration absorbing rubber hose in the form of a refrigerant transporting hose used in an air conditioning system of an automotive vehicle, which is constructed according to one embodiment of the present invention. The rubber hose 10 has a laminar structure including an inner rubber layer 12, a reinforcing layer 14, and an outer rubber layer 16, which layers are laminated integrally with one another in the order of description in a radially outward direction of the rubber hose 10.

The inner rubber layer 12 of the rubber hose 10 is formed of at least one of a butyl rubber material and a halogenated butyl rubber material, so that the inner rubber layer 12 exhibits not only high degrees of resistance to moisture permeability, resistance to low temperature, and resistance to oil, but also a high degree of refrigerant impermeability, in particular, a high degree of gas impermeability to 1,1,1,2-tetrafluoroethane (HFC134a). Any known butyl rubber materials and halogenated butyl rubber materials may be used for forming the inner rubber layer 12. For example, the butyl rubber materials and the halogenated butyl rubber materials are selected from among an IIR (isobutylene-isoprene rubber) material obtained by copolymerization of isobutylene and a small amount of isoprene, a chlorinated IIR material and a brominated IIR material, which are obtained by halogenation of the IIR material.

To the butyl rubber material and/or the halogenated butyl rubber material, various known additives are added to provide a rubber composition for forming the inner rubber layer 12. The additives include one or more of a vulcanizing agent, a filler, a reinforcing agent, an antioxidant, and further include, as needed, a vulcanization accelerator, a softener, a tackifier, a lubricant, a peptizer, a dispersing agent, and a processing aid.

The reinforcing layer 14 may be a fiber reinforcing layer as commonly used as a reinforcing layer of ordinary rubber hoses. For example, the reinforcing layer 14 is formed by spiraling or braiding a known reinforcing thread such as a rayon thread, polyester thread or polyamide thread. The reinforcing layer 14 as the fiber reinforcing layer is laminated on the outer circumferential surface of the inner rubber layer 12.

On the outer circumferential surface of the reinforcing layer 14 which is formed on the outer circumferential surface of the inner rubber layer 12, the outer rubber layer 16 is formed. The outer rubber layer 16 according to the present invention is formed of the ethylene-propylene copolymer, in other words, the EPM material consisting of a binary copolymer of ethylene and propylene. The present rubber hose in which the outer rubber layer is formed of the EPM material exhibits a vibration absorbing characteristic whose temperature dependency is significantly smaller than that of the vibration absorbing characteristic exhibited by the conventional hose whose outer rubber layer is formed of a conventionally used EPDM material, CR material and the like.

As the EPM material for forming the outer rubber layer 16, the ethylene-propylene copolymer which is known in the art and which is vulcanized with a peroxide is employed. The molar ratio of ethylene to propylene in the ethylene-propylene copolymer is generally selected within a range between 40/60–75/25, preferably within a range between 45/55–65/35.

The EPM material described above is vulcanized in a known manner using the peroxide as a vulcanizing agent, so as to provide the outer rubber layer 16. When the EPM material is vulcanized with the peroxide to form the outer rubber layer 16, various additives are added to the EPM material. For instance, in addition to the vulcanizing agent (peroxide), a filler, a reinforcing agent, an antioxidant, a co-crosslinking agent or coagent, etc. are added. Further, a vulcanization accelerator, a softener, a tackifier, a lubricant, a peptizer, a dispersing agent, a processing aid, etc. are added as needed.

As the peroxide used as the vulcanizing agent for vulcanizing the EPM material, any known peroxides may be employed. For instance, the peroxide is selected from among dicumyl peroxide, di-t-butylperoxy di-isopropyl benzene, 2,5-dimethyl-2,5-di-t-butylperoxy hexane, and 2,5-dimethyl-2,5-di-t-butylperoxy hexyne-3. The peroxde is used in an amount of generally 1.5–7.0 parts by weight, preferably 2.0–5.0 parts by weight, per 100 parts by weight of the EPM material.

The EPM material is vulcanized with the peroxide, preferably in the presence of a co-crosslinking agent or coagent whose molecular weight is not smaller than 200 or which has three or more functional groups. This arrangement is effective to prevent deterioration of physical properties exhibited by the vulcanized EPM rubber layer, which is obtained by vulcanization of the EPM material that is laminated on and vulcanized with different kinds of rubber materials to provide the laminar structure of the rubber hose. In the present rubber hose 10 wherein the inner rubber layer 12 and the outer rubber layer 16 are laminated on each other with the reinforcing layer 14 being interposed therebetween, it is desirable that the physical properties of the outer rubber layer 16 which is given by the vulcanized EPM rubber are not deteriorated, for thereby permitting the rubber hose to effectively exhibit the properties required by the vibration absorbing rubber hose.

Examples of the co-crosslinking agent used in the vulcanization of the EPM material with the peroxide include $S_8$ (sulfur: 8-cyclic, MW=256), ethyleneglycol dimethacrylate (MW=198), 1,6-hexanediol dimethacrylate (MW=254), tri-methylolpropane trimethacrylate (MW=338), pentaerythritol triacrylate (MW=298), triallyl isocyanurate (MW=249), diallyl phthalate (MW=246), and 1,2-polybutadiene (MW= 1000–4000). Any other known co-crosslinking agents may be suitably employed. As described above, the co-crosslinking agent having the molecular weight (MW) of not smaller than 200 or having three or more functional groups is advantageously employed. The co-crosslinking agent is used in an amount of generally 0.1–10.0 parts by weight, preferably 0.3–5.0 parts by weight, per 100 parts by weight of the EPM material.

In the present rubber hose 10 wherein the inner rubber layer 12, the reinforcing layer 14 and the outer rubber layer 16 are laminated integrally on one another, the vulcanized EPM rubber which gives the outer rubber layer 16 has a characteristic which satisfies the following formulas:

$E'(-20°\ C.) \leq 1.0 \times 10^9$ dyn/cm²

$[E'(100°\ C.)/E'(-20°\ C.)] \geq 0.1$ tan δ(100° C.) ≧ 0.10

[tan δ(100° C.)/tan δ(-20° C.)] ≧ 0.3 wherein,

E'(-20° C.): storage Young's modulus in an atmosphere at a temperature of -20° C.

tan δ(-20° C.): loss factor in an atmosphere at a temperature of -20° C.

E'(100° C.): storage Young's modulus in an atmosphere at a temperature of 100° C.

tan δ(100° C.): loss factor in an atmosphere at a temperature of 100° C.

According to this arrangement, the rubber hose exhibits excellent flexibility and vibration absorbing characteristic over a wide temperature range from a considerably low temperature of -20° C. to a considerably high temperature of 100° C.

The dimensions of the rubber hose 10 constructed according to the present invention are not particularly limited. In general, the rubber hose 10 has an outside diameter of about 8–50 mm and a thickness value (i.e., the wall thickness of the hose 10) of about 1.8–6 mm. The thickness values of the individual layers of the hose 10 are suitably determined so as to permit the layers to exhibit the respectively intended functions. In general, the inner rubber layer 12 has a thickness value of about 1–4 mm while the outer rubber layer 16 has a thickness value of about 0.8–2 mm.

The present vibration absorbing rubber hose in the form of the rubber hose 10 used for the air conditioning system is manufactured by a known method commonly used for forming an ordinary rubber hose. For example, the inner rubber layer 12, the reinforcing layer 14 and the outer rubber layer 16 are laminated on one another on a mandrel, and the thus obtained laminar tubular structure is vulcanized into an integral tubular structure. Subsequently, the mandrel is removed from the vulcanized integral tubular structure, so that the desired hose is fabricated.

The thus constructed rubber hose 10 wherein the outer rubber layer 16 is formed of the EPM material exhibits a good vibration absorbing characteristic owing to the physical properties of the EPM material. Further, the vibration absorbing characteristic of the rubber hose 10 is less dependent on changes of the temperature in which the rubber hose 10 is used. Accordingly, the rubber hose 10 of the present invention exhibits an excellent vibration absorbing characteristic not only while the air conditioning system is operated, but also while the air conditioning system is not operated and the rubber hose 10 is exposed to a high temperature (around 80–100° C.) in the engine room of the automotive vehicle. Therefore, even when the rubber hose 10 is subjected to the vibrations transmitted from the compressor of the air conditioning system and the engine of the vehicle, the rubber hose 10 is capable of absorbing the vibrations, for thereby effectively reducing the noise which arises from the vibrations.

The construction of the vibration absorbing rubber hose according to the present invention is not limited to that of the rubber hose 10 shown in FIG. 1, but may be otherwise modified. For instance, the rubber hose may include two or more of the inner rubber layers 12, reinforcing layers 14 and outer rubber layers 16. Where the rubber hose includes two or more reinforcing layers 14, a suitable rubber layer may be provided between adjacent two reinforcing layers 14 and 14. Further, an intermediate rubber layer may be provided between the inner rubber layer 12 and the reinforcing layer 14.

S (sulfur)-based vulcanization system was employed. The polymer material and the co-crosslinking agent were combined as indicated in TABLE 1 below, and were used in respective amounts as indicated in TABLE 2 below. The respective rubber compositions included various additives as indicated in TABLE 2 in respective amounts as indicated also in TABLE 2. The rubber compositions for obtaining the vulcanized rubber specimens Nos. 1–7 were vulcanized at 160° C. for 60 minutes while the rubber composition for obtaining the vulcanized rubber specimen No. 8 was vulcanized at 150° C. for 30 minutes. In the PO-based vulcanization system, di-t-butylperoxy di-isopropyl benzene was used as the peroxide. In the S-based vulcanization system for obtaining the specimen No. 7, as the vulcanization accelerator, 1.5 parts by weight of the accelerator TT, 1.5 parts by weight of the accelerator PZ, and 1 part by weight of the accelerator M were used while 1.5 parts by weight of the accelerator 22 was used in the S-based vulcanization system for obtaining the specimen No. 8.

TABLE 1

| | Specimen Nos. | | | | | | | |
|---|---|---|---|---|---|---|---|---|
| | 1 | 2 | 3 | 4 | 5 | 6 | 7 | 8 |
| polymer material | EPM | EPM | EPM | EPM | EPM | EPDM | EPDM | CR |
| co-crosslinking agent | TAIC | TMPT | $S_8$ | PB | ED | TAIC | — | — |
| molecular weight | 249 | 338 | 256 | 1000~2000 | 198 | 249 | — | — |
| number of functional groups | 3 | 3 | 2 | 2 | 2 | 3 | — | — |
| vulcanization system | PO | PO | PO | PO | PO | PO | S | S |

EXAMPLES

To further clarify the present invention, some examples of the present invention will be described. It is to be understood that the present invention is not limited to the details of these examples, but may be embodied with various changes, modifications and improvements, other than the following examples and the details of the foregoing descriptions, which may occur to those skilled in the art, without departing from the spirit of the invention defined in the attached claims.

Initially, various vulcanized rubber specimens Nos. 1–8 were prepared by using respective rubber compositions as indicated in TABLE 1 and TABLE 2 below. Described in detail, in preparing the respective rubber compositions, there were used, as the polymer material, an EPM material ("ESPRENE 201" available from SUMITOMO CHEMICAL CO., LTD., Japan), an EPDM material ("ESPRENE 501A" available from SUMITOMO CHEMICAL CO., LTD., Japan), and a CR material ("NEOPRENE WHV" available from DuPont Dow Elastomers, Japan). As the co-crosslinking agent, TAIC (triallyl isocyanurate), TMPT (trimethylolpropane trimethacrylate), $S_8$ (sulfer: 8-cyclic), PB (polybutadiene "RB 810" available from JSR CORPORATION, Japan), and ED (ethyleneglycol dimethacrylate) were used. The molecular weight and the number of functional groups of each co-crosslinking agent are indicated in TABLE 2 below. As the vulcanization system, either PO (peroxide)-based vulcanization system or

TABLE 2

| Components (part by weight) | Specimen Nos. | | | | | | | |
|---|---|---|---|---|---|---|---|---|
| | 1 | 2 | 3 | 4 | 5 | 6 | 7 | 8 |
| polymer | 100 | 100 | 100 | 100 | 100 | 100 | 100 | 100 |
| zinc oxide | 5 | 5 | 5 | 5 | 5 | 5 | 5 | 5 |
| stearic acid | 1 | 1 | 1 | 1 | 1 | 1 | 1 | 1 |
| carbon black (FEF) | 40 | 40 | 40 | 40 | 40 | 40 | 40 | 40 |
| paraffinic process oil | 10 | 10 | 10 | 10 | 10 | 10 | 10 | — |
| naphthenic process oil | — | — | — | — | — | — | — | 10 |
| co-crosslinking agent | 2 | 3.5 | 0.5 | 5 | 2 | — | — | — |
| vulcanizing agent PO | 2.5 | 2.5 | 2.5 | 2.5 | 2.5 | 2.5 | — | — |
| vulcanizing agent S | — | — | — | — | — | — | 1 | — |
| vulcanization accelerator | — | — | — | — | — | — | 4 | 1.5 |

Each of the obtained vulcanized rubber specimens was measured of its initial physical properties, i.e., a breaking strength (TB), a breaking elongation (Eb), and a type-A durometer hardness ($H_A$). Each of the vulcanized rubber specimens was also measured of its dynamic properties in the following manner. For measuring the dynamic properties, a rectangular test piece of each vulcanized rubber specimen was used. Each test piece has a free length of 20 mm (i.e., the length of the test piece between chucks measured when the test piece was gripped at its opposite longitudinal ends by the chucks), a width of 5 mm, and a thickness of 2 mm. The measurement of the dynamic properties was conducted by a method according to the "Tensile test" described in "General data of testing methods of dynamic properties using a small-sized tester (Table 6)" of "Testing methods of dynamic properties for rubber, vulcanized or thermoplastic" according to the Japanese Industrial Standard (JIS) K 6394 (1998). Each test piece was measured of its storage Young's modulus [E'(−20° C.)] and loss factor [tan δ(−20° C.)] in an atmosphere at a temperature of −20° C., and storage Young's modulus [E'(100° C.)] and loss factor [tan δ(100° C.)] in an atmosphere at a temperature of 100° C., under the following conditions: free length of 20 mm; strain of 0.1%; and frequency of 100 Hz. The results are indicated in TABLE 3 and TABLE 4 below.

The vulcanized rubber specimens were examined of their physical properties when the vulcanized rubber specimens were obtained such that the rubber compositions giving the respective vulcanized rubber specimens were laminated on and vulcanized with a different kind of rubber material. Described in detail, an unvulcanized rubber sheet formed of each of the rubber compositions giving the respective vulcanized rubber specimens was laminated on an unvulcanized IIR rubber sheet which is obtained by using an IIR material as a rubber material. After the thus obtained unvulcanized laminar structure has been kept at 40° C. for 24 hours, it was vulcanized at 160° C. for 60 minutes, for thereby providing an integrally vulcanized laminar structure. A portion of each of the integrally vulcanized laminar structures, which portion corresponds to each of the vulcanized rubber specimens Nos. 1–8, was removed and measured of its breaking strength and breaking elongation, and ratios of the amounts of change (ΔTB, ΔEB) of the breaking strength and the breaking elongation to the respective initial values were calculated. The results are also indicated in TABLE 3 and TABLE 4 below. The above-indicated unvulcanized IIR rubber sheet was prepared from an IIR rubber composition which contains 50 parts by weight of C1-IIR material ("JSR-HT1066" available from JSR CORPORATION, Japan), 50 parts by weight of IIR ("JSR365" available from JSR CORPORATION, Japan), 5 parts by weight of zinc oxide, 1 part by weight of stearic acid, 60 parts by weight of carbon black (FEF), 5 parts by weight of naphthenic process oil, and 12 parts by weight of alkylphenol formaldehyde resin.

TABLE 3

| | Specimen Nos. | | | |
|---|---|---|---|---|
| | 1 | 2 | 3 | 4 |
| Initial properties | | | | |
| TB (MPa) | 11.0 | 11.2 | 12.6 | 11.7 |
| EB (%) | 400 | 440 | 570 | 560 |
| $H_A$ | 55 | 56 | 55 | 54 |
| Dynamic properties | | | | |
| E' (−20° C.) (dyn/cm$^2$) | 3.2 × 10$^8$ | 3.3 × 10$^8$ | 4.0 × 10$^8$ | 3.6 × 10$^8$ |
| E' (100° C.)/E' (−20° C.) | 0.21 | 0.21 | 0.2 | 0.21 |
| tan δ (100° C.) | 0.16 | 0.15 | 0.16 | 0.15 |
| tan δ (100° C.)/tan δ (−20° C.) * | 0.38 | 0.39 | 0.33 | 0.41 |

TABLE 3-continued

| | Specimen Nos. | | | |
|---|---|---|---|---|
| | 1 | 2 | 3 | 4 |
| ΔTB (%) | −5 | −7 | −10 | −8 |
| ΔEB (%) | +10 | +7 | +9 | +7 |

*: ratios of the amounts of change of the breaking strength and the breaking elongation to the respective initial values

TABLE 4

| | Specimen Nos. | | | |
|---|---|---|---|---|
| | 5 | 6 | 7 | 8 |
| Initial properties | | | | |
| TB (MPa) | 11.3 | 12.0 | 11.5 | 11.8 |
| EB (%) | 470 | 280 | 480 | 420 |
| $H_A$ | 56 | 57 | 55 | 57 |
| Dynamic properties | | | | |
| E' (−20° C.) (dyn/cm$^2$) | 3.1 × 10$^8$ | 5.0 × 10$^8$ | 3.4 × 10$^8$ | 9.0 × 10$^8$ |
| E' (100° C.)/E' (−20° C.) | 0.22 | 0.21 | 0.21 | 0.06 |
| tan δ (100° C.) | 0.16 | 0.09 | 0.08 | 0.13 |
| tan δ (100° C.)/tan δ (−20° C.) * | 0.35 | 0.24 | 0.23 | 0.16 |
| ΔTB (%) | −30 | −7 | −5 | −3 |
| ΔEB (%) | +11 | +11 | +4 | +2 |

*: ratios of the amounts of change of the breaking strength and the breaking elongation to the respective initial values As is apparent from the results indicated in the above TABLE 3 and TABLE 4, the vulcanized rubber specimens Nos. 1–5 which had been obtained by vulcanizing the EPM material with the peroxide exhibited excellent dynamic properties in terms of the storage Young's modulus (E') and the loss factor (tan δ). Further, in those vulcanized rubber specimens Nos. 1–5, the value E'(100° C.)/E'(−20° C.) and the value tan δ (100° C.)/tan δ (−20° C.), which respectively represent the amounts of change of the storage Young's modulus and the loss factor in a temperature range from the low temperature of −20° C. to the high temperature of 100° C., are not smaller than 0.1 and not smaller than 0.3, respectively. Accordingly, it is confirmed that the vulcanized rubber specimens Nos. 1–5 have a good vibration absorbing characteristic and that the temperature dependency of the vibration absorbing characteristic of those vulcanized rubber specimens Nos. 1–5 is significantly reduced. In contrast, the vulcanized rubber specimens Nos. 7 and 8 which were obtained by using the EPDM material and the CR material, respectively, have comparatively small values of the tan δ, and accordingly cannot exhibit a sufficiently high degree of vibration absorbing characteristic. Moreover, the value tan δ (100° C.)/tan δ (−20° C.) is comparatively small in the vulcanized rubber specimens Nos. 7 and 8, so that the temperature dependency of the vibration absorbing characteristic of the vulcanized rubber specimens Nos. 7 and 8 is relatively large. Accordingly, the vulcanized rubber specimens Nos. 7 and 8 are not capable of exhibiting the vibration absorbing characteristic over a wide temperature range from the low temperature to the high temperature. In particular, the vulcanized rubber specimens Nos. 7 and 8 cannot exhibit a sufficiently high vibration absorbing characteristic in the high temperature condition.

Among the vulcanized rubber specimens Nos. 1–5 obtained by using the EPM material, the specimens Nos.

1–4, which were obtained by vulcanization with the peroxide in the presence of the co-crosslinking agent whose molecular weight (MW) is not smaller than 200 or which has three or more functional groups, do not suffer from deterioration of the physical properties of the vulcanized EPM rubber even when the EPM material is laminated on and vulcanized with the different kind of rubber (IIR) so as to provide the laminar structure of the rubber hose. Therefore, the vulcanized EPM rubber advantageously assures the physical properties required by the outer rubber layer of the rubber hose having the laminar structure.

There were formed two rubber hoses each having the laminar structure similar to that of the rubber hose shown in FIG. 1, by respectively using the rubber composition including the EPM material (hereinafter referred to as "EPM rubber composition") for obtaining the vulcanized rubber specimen No. 1, and the rubber composition including the EPDM material (hereinafter referred to as "EPDM rubber composition") for obtaining the vulcanized rubber specimen No. 7. Described more specifically, the inner rubber layer 12 is formed by extrusion of the above-described IIR rubber composition. On the inner rubber layer 12, a first spiral reinforcing layer is formed by using twenty-two polyester threads (3000 denier). On the thus formed first spiral reinforcing layer, an intermediate rubber layer is formed by extrusion of the above-described IIR rubber composition. A second spiral reinforcing layer 14 is formed on the intermediate rubber layer by using twenty-two polyester threads (3000 denier). On the thus formed second spiral reinforcing layer 14, the outer rubber layer 16 is formed by extrusion of the EPM rubber composition for obtaining the vulcanized rubber specimen No. 1 or the EPDM rubber composition for obtaining the vulcanized rubber specimen No. 7. The obtained unvulcanized tubular body whose outer rubber layer 16 is formed of the EPM rubber composition and the unvulcanized tubular body whose outer rubber layer 16 is formed of the EPDM rubber composition were vulcanized with the peroxide or the sulfur, at 160° C. for 60 minutes. The obtained two rubber hoses had an outside diameter of 22 mm and an inside diameter of 14.5 mm. The thickness values of the inner rubber layer 12, the intermediate rubber layer, and the outer rubber layer 16 were 1.6 mm, 0.2 mm, and 1 mm, respectively.

Figure 2:
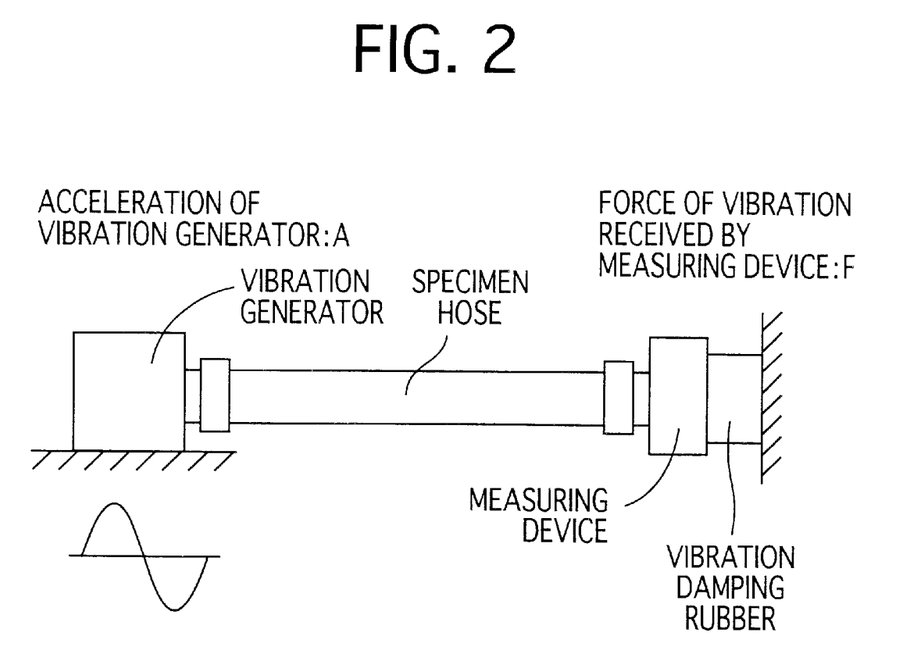
FIG. 2 is a view schematically showing a system for measuring the force of vibration transmitted through the hose.

The two rubber hoses produced as described above were examined of their vibration absorbing characteristics by using a system as shown in FIG. 2 in the following manner. Initially, a specimen of each of the rubber hoses, which specimen has a length of 420 mm, was disposed, between a vibration generator and a measuring device for measuring force of vibration which is generated by the vibration generator and transmitted to the measuring device via the specimen hose, such that the vibration generator was attached to one of its opposite axial ends of the specimen hose and that the measuring device was attached to the other axial end of the specimen hose, so that a free length of the specimen hose, i.e., the length of the specimen hose between chucks measured when the specimen hose is gripped by the chucks, was 390 mm. The force of vibration which is generated by the vibration generator and transmitted to the measuring device via the specimen hose was measured in an atmosphere at 25° C. and in an atmosphere at 100° C., under an oscillating condition of 3G and 200 Hz. A difference between the force of vibration transmitted to the measuring device via the specimen hose whose outer rubber layer is formed of the EPDM rubber composition for giving the vulcanized rubber specimen No. 7 and the force of vibration transmitted to the measuring device via the specimen hose whose outer rubber layer is formed of the EPM rubber composition for giving the vulcanized rubber specimen No. 1 was calculated. A difference of the force of vibration for 1G, i.e., the force of vibration transmitted via the specimen hose (No. 7) minus the force of vibration transmitted via the specimen hose (No. 1), was 0.2 dB at 25° C. and 1.5 dB at 100° C.

Figure 3:
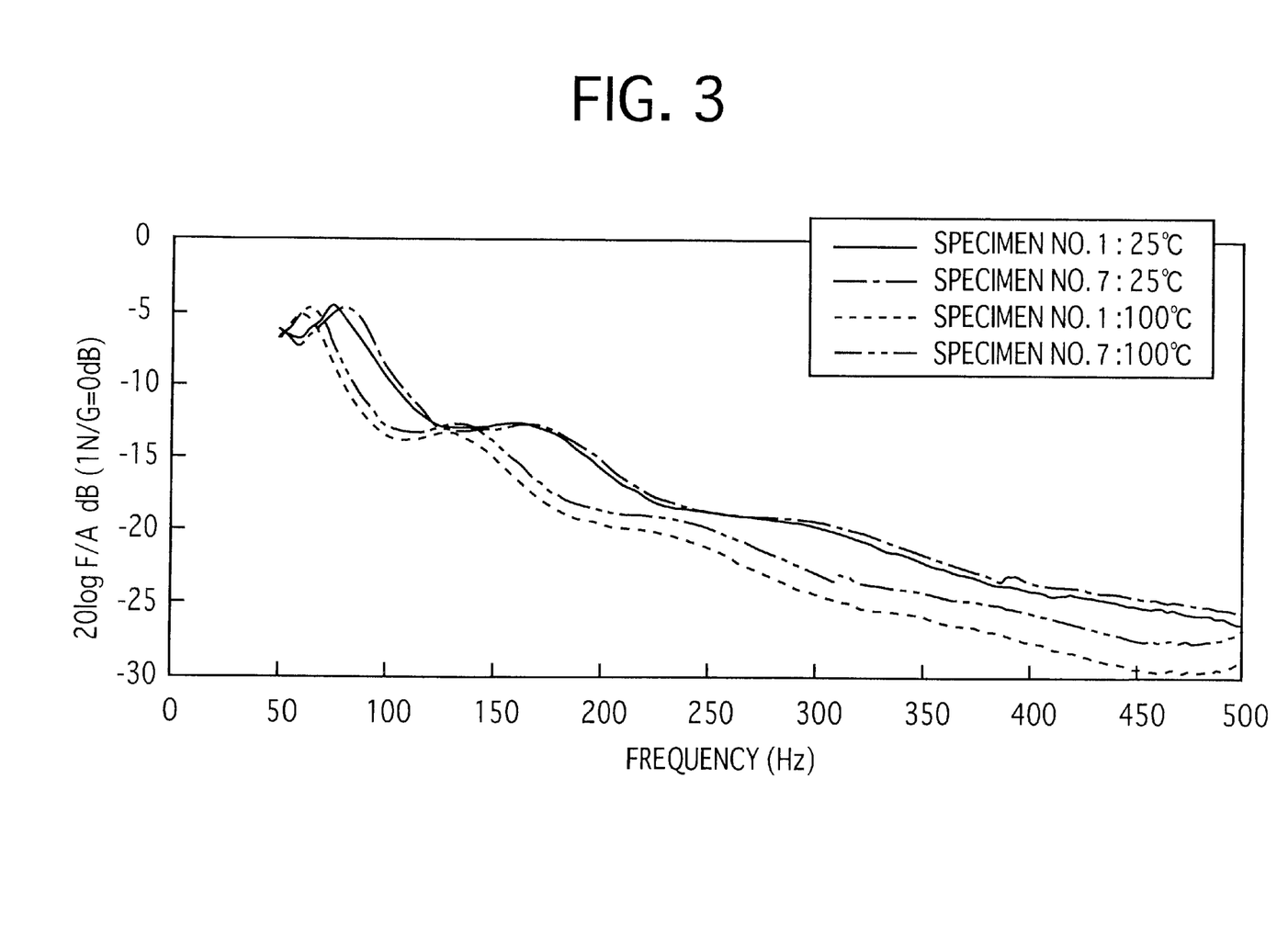
FIG. 3 is a graph showing results of the measurement of the force of vibration.

The force of vibration transmitted to the measuring device via each of the specimen rubber hoses was measured at different oscillation frequency values. The results are indicated in the graph of FIG. 3. As is apparent from the results shown in the graph of FIG. 3, the rubber hose whose outer rubber layer 16 is formed of the EPM rubber composition for giving the vulcanized rubber specimen No. 1 exhibited more excellent vibration absorbing characteristic in both of the atmospheres at 25° C. and at 100° C., than the rubber hose whose outer rubber layer 16 is formed of the EPDM rubber composition for giving the vulcanized rubber specimen No. 7.

It will be understood from the foregoing description that the present vibration absorbing rubber hose exhibits an excellent vibration absorbing characteristic. Further, the temperature dependency of the vibration absorbing characteristic of the present rubber hose is significantly reduced, so that the present rubber hose is capable of exhibiting a good vibration absorbing characteristic over a wide temperature range from the considerably low temperature to the considerably high temperature. Moreover, the present rubber hose exhibits a high degree of impermeability to the refrigerant, especially to the HFC134a, in other words, the present rubber hose exhibits a high degree of gas impermeability, whereby the present rubber hose can be advantageously used as a refrigerant transporting hose for the automotive vehicle.

What is claimed is:

1. A vibration absorbing rubber hose having a laminar structure including an innermost layer, a reinforcing layer, and an outer rubber layer, which layers are laminated integrally with one another in the order of description in a radially outward direction of said rubber hose, wherein the improvement comprises:

said innermost layer being formed of a butyl rubber material and/or a halogenated butyl rubber material while said outer rubber layer is formed of an EPM material consisting of ethylene-propylene copolymer.

2. A vibration absorbing rubber hose according to claim 1, wherein said EPM material is vulcanized to provide said outer rubber layer, by using a peroxide as a vulcanizing agent in the presence of a co-crosslinking agent whose molecular weight is not smaller than 200 or which has three or more functional groups.

3. A vibration absorbing rubber hose according to claim 1, wherein said EPM material which has been vulcanized with said peroxide in the presence of said co-crosslinking agent to provide said outer rubber layer has a characteristic which satisfies the following formulas:

$E'(-20° C.)1.0 \times 10^9$ dyn/cm$^2$ $[E'(100° C.)/E'(-20° C.)] \leq 0.1$ tan $\delta(100° C.) \leq 0.10$ $[\tan \delta(100° C.)/\tan \delta(-20° C.)] \leq 0.3$ wherein,
E'(−20° C.): storage Young's modulus in an atmosphere at a temperature of −20° C.
tan δ (−20° C.): loss factor in an atmosphere at a temperature of −20° C.

E'(100° C.): storage Young's modulus in an atmosphere at a temperature of 100° C.

tan δ (100° C.): loss factor in an atmosphere at a temperature of 100° C.

4. A vibration absorbing rubber hose according to claim 1, wherein a molar ratio of ethylene to propylene in said ethylene-propylene copolymer is selected within a range between 40/60 and 75/25.

5. A vibration absorbing rubber hose according to claim 1, wherein a molar ratio of ethylene to propylene in said ethylene-propylene copolymer is selected within a range between 45/55 and 65/35.

6. A vibration absorbing rubber hose according to claim 2, wherein said peroxide as said vulcanizing agent is selected from the group consisting of: dicumyl peroxide, di-t-butylperoxy di-isopropyl benzene, 2,5-dimethyl-2,5-di-t-butylperoxy hexane, and 2,5-dimethyl-2,5-di-t-butylperoxy hexyne-3.

7. A vibration absorbing rubber hose according to claim 2, wherein said peroxide is used in an amount of 1.5–7.0 parts by weight per 100 parts by weight of said EPM material.

8. A vibration absorbing rubber hose according to claim 2, wherein said peroxide is used in an amount of 2.0–5.0 parts by weight per 100 parts by weight of said EPM material.

9. A vibration absorbing rubber hose according to claim 2, wherein said co-crosslinking agent is selected from the group consisting of: $S_8$, ethyleneglycol dimethacrylate, 1,6-hexanediol dimethacrylate, trimethylolpropane trimethacrylate, pentaerythritol triacrylate, triallyl isocyanurate, diallyl phthalate, and 1,2-polybutadiene.

10. A vibration absorbing rubber hose according to claim 2, wherein said co-crosslinking agent is used in an amount of 0.1–10.0 parts by weight per 100 parts by weight of said EPM material.

11. A vibration absorbing rubber hose according to claim 2, wherein said co-crosslinking agent is used in an amount of 0.3–5.0 parts by weight per 100 parts by weight of said EPM material.

12. A vibration absorbing rubber hose according to claim 1, wherein said vibration absorbing rubber hose is used as a refrigerant transporting hose for transporting a refrigerant.

13. A vibration absorbing rubber hose according to claim 12, wherein said refrigerant contains 1,1,1,2-tetrafluoroethane as a major component.

* * * * *